US012559064B2

(12) United States Patent
Min

(10) Patent No.: US 12,559,064 B2
(45) Date of Patent: Feb. 24, 2026

(54) ULTRA WIDE BAND BASED DIGITAL KEY POSITIONING AND OBJECT SENSOR POSITIONING FUSION WITH VEHICLE CONTROL

(71) Applicants:Hyundai Motor Company, Seoul (KR); Kia Corporation, Seoul (KR)

(72) Inventor: Jaewoong Min, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 181 days.

(21) Appl. No.: 18/387,714

(22) Filed: Nov. 7, 2023

(65) Prior Publication Data
US 2024/0336228 A1 Oct. 10, 2024

(30) Foreign Application Priority Data

Apr. 7, 2023 (KR) ........................ 10-2023-0046124

(51) Int. Cl.
*B60R 25/30* (2013.01)
*B60R 25/24* (2013.01)
*B60W 60/00* (2020.01)

(52) U.S. Cl.
CPC ............ *B60R 25/305* (2013.01); *B60R 25/24* (2013.01); *B60W 60/001* (2020.02); *B60R 2325/101* (2013.01); *B60R 2325/20* (2013.01); *B60W 2420/403* (2013.01); *B60W 2420/408* (2024.01); *B60W 2554/80* (2020.02); *B60W 2556/35* (2020.02)

(58) Field of Classification Search
None
See application file for complete search history.

(56) References Cited

U.S. PATENT DOCUMENTS

| | | | | |
|---|---|---|---|---|
| 2020/0341114 A1* | 10/2020 | Acharya | ................. | G01S 13/26 |
| 2022/0301371 A1* | 9/2022 | Tertinek | ................ | H04W 12/06 |
| 2023/0319811 A1* | 10/2023 | Jain | ......................... | H04B 1/69 |
| 2024/0317178 A1* | 9/2024 | Mizukoshi | ............ | B60R 25/245 |
| 2025/0050839 A1* | 2/2025 | Ette | ....................... | B60R 25/245 |

FOREIGN PATENT DOCUMENTS

| | | | | | |
|---|---|---|---|---|---|
| CN | 104278907 A | * | 1/2015 | ............... | G01S 7/41 |
| KR | 20180119055 A | * | 11/2018 | ............ | B60W 30/14 |

OTHER PUBLICATIONS

Machine translation of CN-104278907-A (Year: 2015).*
Machine translation of KR-20180119055-A (Year: 2018).*

* cited by examiner

*Primary Examiner* — Kenneth M Dunne
(74) *Attorney, Agent, or Firm* — Fox Rothschild LLP

(57) ABSTRACT
A vehicle may include: an autonomous vehicle sensor configured to detect an object located around the vehicle; an ultra wide band (UWB) module configured to receive a UWB signal transmitted from a digital key; and a controller configured to be electrically connected to the UWB module. The controller is configured to obtain sensor-based positioning information of the object located around the vehicle based on sensor data obtained by the autonomous vehicle sensor, obtain UWB-based positioning information of the digital key based on the UWB signal received in the UWB module, determine a position of the digital key based on the sensor-based positioning information of the object and the UWB-based positioning information of the digital key, and control the vehicle based on the determined position of the digital key.

20 Claims, 10 Drawing Sheets

OBTAIN CAMERA DATA, RADAR DATA AND LIDAR DATA ⌐∽200

OBTAIN SENSOR-BASED POSITIONING INFORMATION AND EXPECTED PATH OF OBJECT ⌐∽202

OBTAIN UWB-BASED POSITIONING INFORMATION OF DIGITAL KEY ⌐∽204

DETERMINE POSITION OF DIGITAL KEY BASEDN ON UWB-BASED POSITIONING INFORMATION AND SENSOR-BASED POSITIONING INFORMATION ⌐∽206

CONTROL VEHICLE DOORS/VEHICLE START ⌐∽208

GRID MAP

FIG. 7

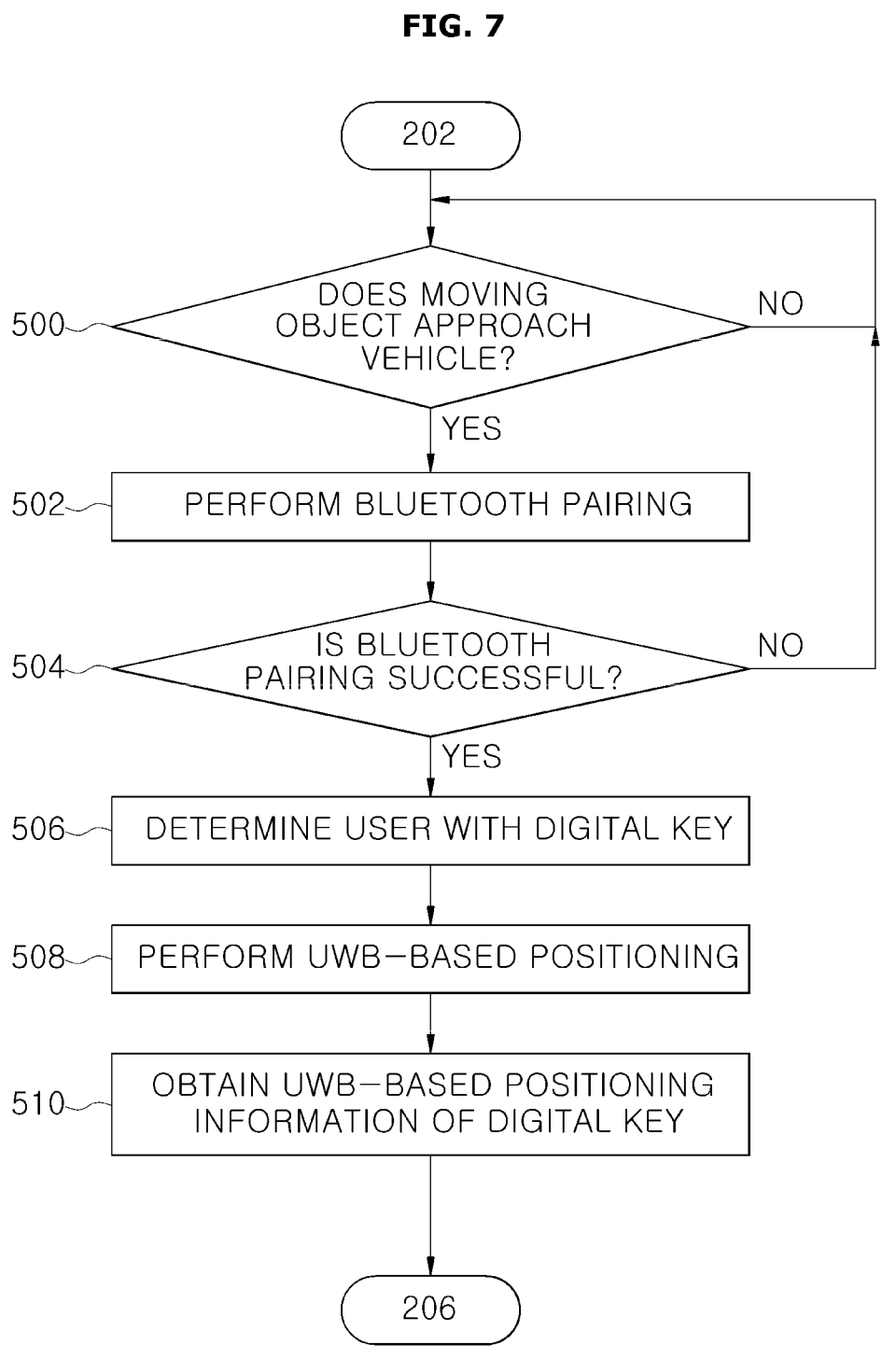

```
                        ┌─────────┐
                        │   202   │
                        └─────────┘
                             │
                             ▼
                    ╱────────────────╲
                   ╱  DOES MOVING     ╲         NO
         500 ─────╱   OBJECT APPROACH  ╲──────────────┐
                  ╲    VEHICLE?        ╱               │
                   ╲────────────────╱                 │
                             │ YES                     │
                             ▼                         │
         502 ─┌──────────────────────────────┐        │
             │  PERFORM BLUETOOTH PAIRING     │        │
              └──────────────────────────────┘        │
                             │                         │
                             ▼                         │
                    ╱────────────────╲        NO       │
         504 ─────╱   IS BLUETOOTH    ╲────────────────┤
                  ╲ PAIRING SUCCESSFUL?╱               │
                   ╲────────────────╱                  │
                             │ YES
                             ▼
         506 ─┌──────────────────────────────┐
             │ DETERMINE USER WITH DIGITAL KEY│
              └──────────────────────────────┘
                             │
                             ▼
         508 ─┌──────────────────────────────┐
             │ PERFORM UWB−BASED POSITIONING  │
              └──────────────────────────────┘
                             │
                             ▼
         510 ─┌──────────────────────────────┐
             │ OBTAIN UWB−BASED POSITIONING   │
             │ INFORMATION OF DIGITAL KEY     │
              └──────────────────────────────┘
                             │
                             ▼
                        ┌─────────┐
                        │   206   │
                        └─────────┘
```

1

ULTRA WIDE BAND BASED DIGITAL KEY POSITIONING AND OBJECT SENSOR POSITIONING FUSION WITH VEHICLE CONTROL

CROSS-REFERENCE TO RELATED APPLICATION

This application is based on and claims priority under 35 U.S.C. § 119 to Korean Patent Application No. 10-2023-0046124, filed on Apr. 7, 2023 in the Korean Intellectual Property Office, the disclosure of which is incorporated herein by reference in entirety.

BACKGROUND

Technical Field

The disclosure relates to a vehicle and a control method thereof that may locate a position of a digital key.

Background

After Bluetooth pairing with a user terminal, which is a digital key carried by a user, a vehicle performs an authentication process. Once the authentication process is completed, the vehicle locates a user's position via ultra wide band (UWB) communication, and performs access control or vehicle start control when the user approaches or enters the vehicle.

However, because an existing method depends on UWB communication data between a vehicle and a user terminal, a position of a smartphone may not be accurately identified when external noise interferes with UWB communication. Also, when a user with a digital key approaches a vehicle on a bicycle, motorcycle, or scooter, rather than on foot, it may not be accurately determined from UWB communication data whether the user is moving with the digital key, only the digital key is moving in an unusual manner, or the UWB communication data is abnormal.

SUMMARY

An aspect of the disclosure provides a vehicle and a control method thereof that may combine a sensor-based positioning technology using autonomous vehicle sensors with an ultra wide band UWB-based positioning technology, thereby improving a positioning accuracy and positioning reliability of a digital key.

Additional aspects of the disclosure will be set forth in part in the description which follows and, in part, will be obvious from the description, or may be learned by practice of the disclosure.

According to an embodiment of the disclosure, a vehicle may include: an autonomous vehicle sensor configured to detect an object located around the vehicle; an ultra wide band (UWB) module configured to receive a UWB signal transmitted from a digital key; and a controller configured to be electrically connected to the UWB module. The controller may be configured to: obtain sensor-based positioning information of the object located around the vehicle based on sensor data obtained by the autonomous vehicle sensor, obtain UWB-based positioning information of the digital key based on the UWB signal received in the UWB module, determine a position of the digital key based on the sensor-based positioning information of the object and the UWB-based positioning information of the digital key, and control the vehicle based on the determined position of the digital key.

The autonomous vehicle sensor may include a combination of at least two of: (1) a camera, (2) a radar, or (3) a laser imaging, detection, and ranging (lidar) which are provided to have a field of view around the vehicle. The controller may be further configured to: in response to a vehicle network being in a wake-up state, classify the object into stationary objects and moving objects based on fusion data obtained by the autonomous vehicle sensor, generate a moving object list for moving objects moving in a direction of the vehicle among the moving objects, and obtain sensor-based positioning information of the moving object list, and in response to the vehicle network being in a sleep state, perform Bluetooth pairing, request to wake up an autonomous driving controller connected to the vehicle network after the Bluetooth pairing is successful, and receive the sensor-based positioning information of the moving object list from the woken autonomous driving controller to obtain the sensor-based positioning information of the moving object list.

The controller may be further configured to generate a grid map based on the fusion data, and match the moving object list with the grid map to obtain the sensor-based positioning information of the moving object list.

The controller may be further configured to sort a pedestrian and a two-wheeled vehicle from among the moving objects, generate the moving object list for moving objects moving in the direction of the vehicle among the pedestrian and the two-wheeled vehicle, and generate an expected path of the moving object list according to a movement path of the moving object list and respective positions of the stationary objects.

The vehicle may further include a Bluetooth module configured to perform Bluetooth communication with the digital key. The controller may be further configured to perform Bluetooth communication through the Bluetooth module in response to the moving object list approaching the vehicle within a preset range, and determine a moving object that successfully pairs with the Bluetooth module from the moving object list as a user with the digital key.

The controller may be further configured to perform UWB communication with the digital key based on an expected path of the user with the digital key, and obtain the UWB-based positioning information of the digital key based on the UWB signal received from the digital key. The controller may be further configured to determine the position of the digital key based on sensor-based positioning information of the user with the digital key and the UWB-based positioning information of the digital key.

The controller may be further configured to determine the position of the digital key based on the sensor-based positioning information of the user with the digital key and the UWB-based positioning information of the digital key, in response to the UWB signal being normal and a sensor positioning performance index of the autonomous vehicle sensor being higher than a preset index.

The controller may be further configured to determine the position of the digital key based on the UWB-based positioning information of the digital key, in response to the UWB signal being normal and a sensor positioning performance index of the autonomous vehicle sensor being lower than a preset index.

The controller may be further configured to determine the position of the digital key based on the sensor-based positioning information of the user with the digital key, in response to the UWB signal being abnormal and a sensor positioning performance index of the autonomous vehicle sensor being higher than a preset index.

According to an embodiment of the disclosure, a control method of a vehicle may include: obtaining sensor data through an autonomous vehicle sensor configured to detect an object located around the vehicle; obtaining sensor-based positioning information of the object located around the vehicle based on the obtained sensor data; obtaining, by an ultra wide band (UWB) module, UWB-based positioning information of a digital key based on a signal transmitted from the digital key; determining a position of the digital key based on the sensor-based positioning information of the object and the UWB-based positioning information of the digital key; and controlling the vehicle based on the deter- mined position of the digital key.

The autonomous vehicle sensor may include a combina- tion of at least two of: (1) a camera, (2) a radar, or (3) a lidar which are provided to have a field of view around the vehicle. The obtaining of the sensor-based positioning infor- mation of the object step may further include: in response to a vehicle network being in a wake-up state, classifying the object into stationary objects and moving objects based on fusion data obtained by the autonomous vehicle sensor, generating a moving object list for moving objects moving in a direction of the vehicle among the moving objects, and obtaining sensor-based positioning information of the mov- ing object list, and in response to the vehicle network being in a sleep state, performing Bluetooth pairing, requesting to wake up an autonomous driving controller connected to the vehicle network after the Bluetooth pairing is successful, and receiving the sensor-based positioning information of the moving object list from the woken autonomous driving controller to obtain the sensor-based positioning information of the moving object list.

The obtaining of the sensor-based positioning information of the object step may further include: generating a grid map based on the fusion data, and matching the moving object list with the grid map to obtain the sensor-based positioning information of the moving object list.

The obtaining of the sensor-based positioning information of the object step may further include: sorting a pedestrian and a two-wheeled vehicle from among the moving objects, generating the moving object list for moving objects moving in the direction of the vehicle among the pedestrian and the two-wheeled vehicle, and generating an expected path of the moving object list according to a movement path of the moving object list and positions of the stationary objects.

The obtaining of the UWB-based positioning information of the digital key step may further include: performing Bluetooth communication through a Bluetooth module con- figured to perform Bluetooth communication with the digital key, in response to the moving object list approaching the vehicle within a preset range, and determining a moving object successfully Bluetooth paired from the moving object list as a user with the digital key.

The obtaining of the UWB-based positioning information of the digital key step may further include: performing UWB communication with the digital key based on an expected path of the user with the digital key, and obtaining the UWB-based positioning information of the digital key based on the UWB signal received from the digital key.

The determining of the position of the digital key step may further include determining the position of the digital key based on sensor-based positioning information of the user with the digital key and the UWB-based positioning information of the digital key.

The determining of the position of the digital key step may further include determining the position of the digital key based on the sensor-based positioning information of the user with the digital key and the UWB-based positioning information of the digital key, in response to the UWB signal being normal and a sensor positioning performance index of the autonomous vehicle sensor being higher than a preset index.

The determining of the position of the digital key step may further include determining the position of the digital key based on the UWB-based positioning information of the digital key, in response to the UWB signal being normal and a sensor positioning performance index of the autonomous vehicle sensor being lower than a preset index.

The determining of the position of the digital key step may further include determining the position of the digital key based on the sensor-based positioning information of the user with the digital key, in response to the UWB signal being abnormal and a sensor positioning performance index of the autonomous vehicle sensor being higher than a preset index.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a flowchart illustrating operations of obtaining UWB-based positioning information of a digital key using UWB-based positioning in a vehicle according to an embodiment;

DETAILED DESCRIPTION

Figure 1:
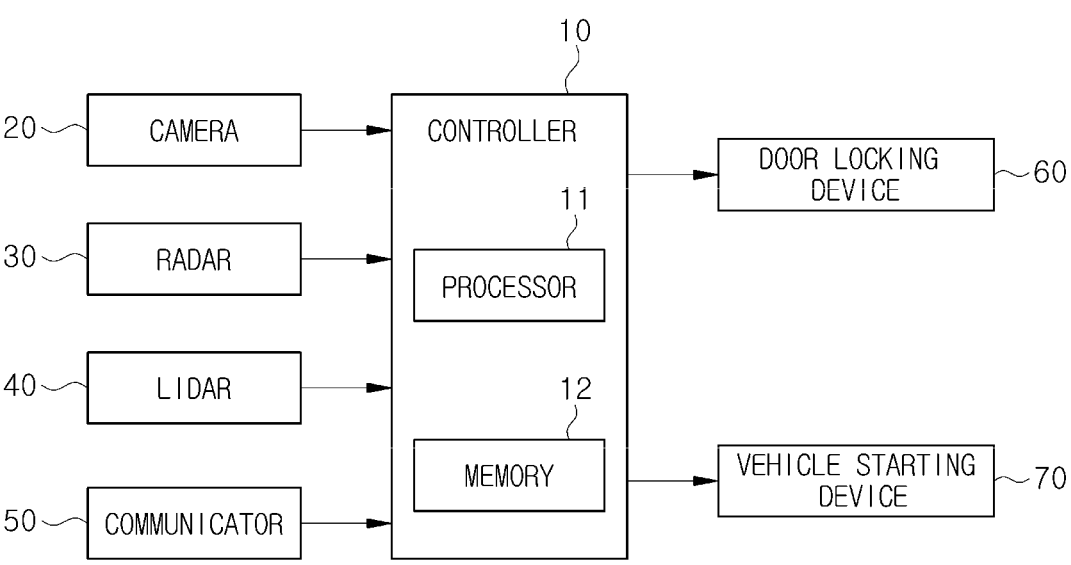
FIG. 1 is a control block diagram illustrating a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "part", "member", "module", "device", and the like may refer to at least one process processed by at least one hardware or software. According to embodiments, a plurality of "parts". "members", "modules", "devices" may be embodied as a single element, or a single of a "part", "member", "module", "device" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Figure 2:
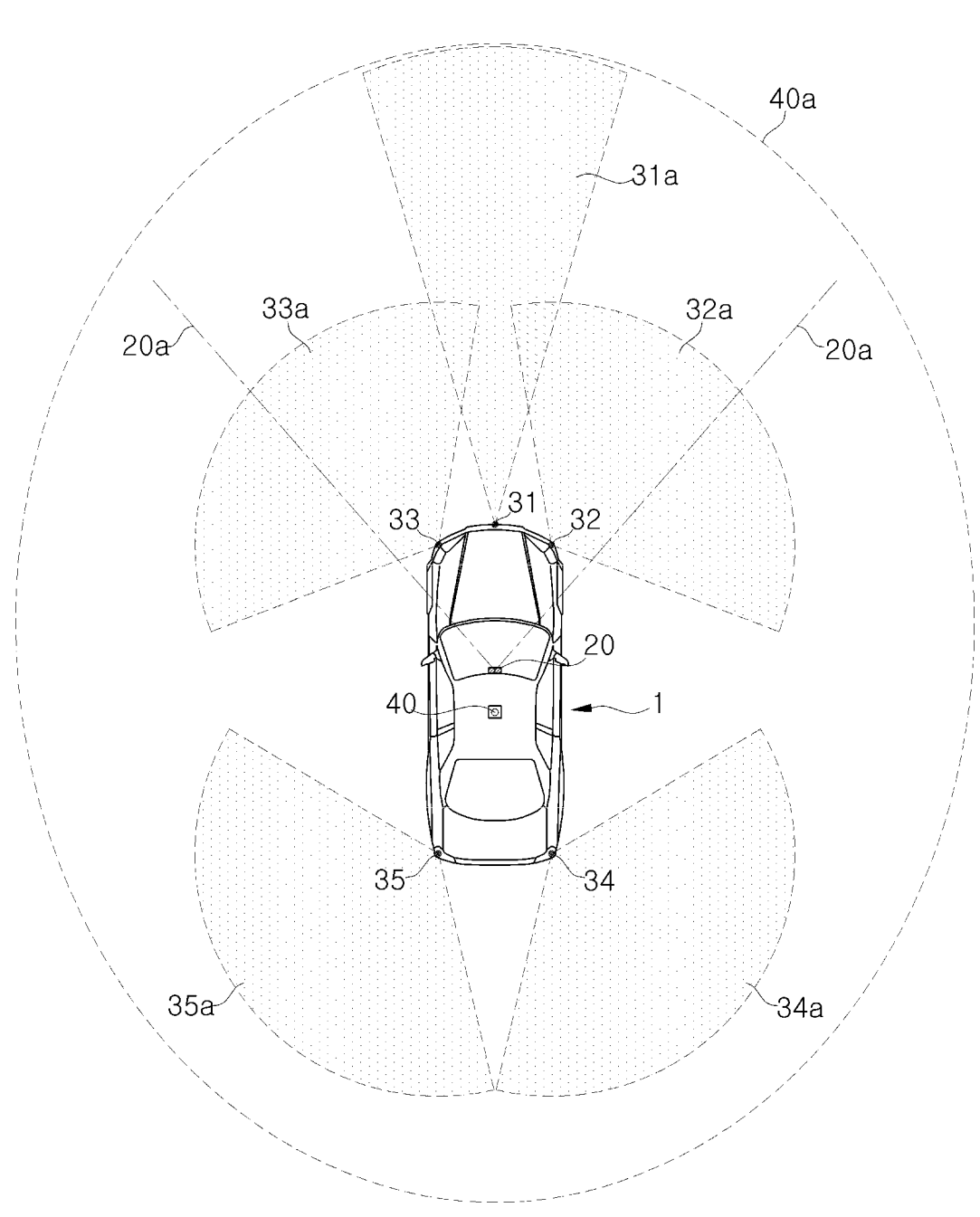
FIG. 2 illustrates autonomous vehicle sensors such as cameras, radars, lidars, and the like, mounted on a vehicle according to an embodiment.
Figure 3:
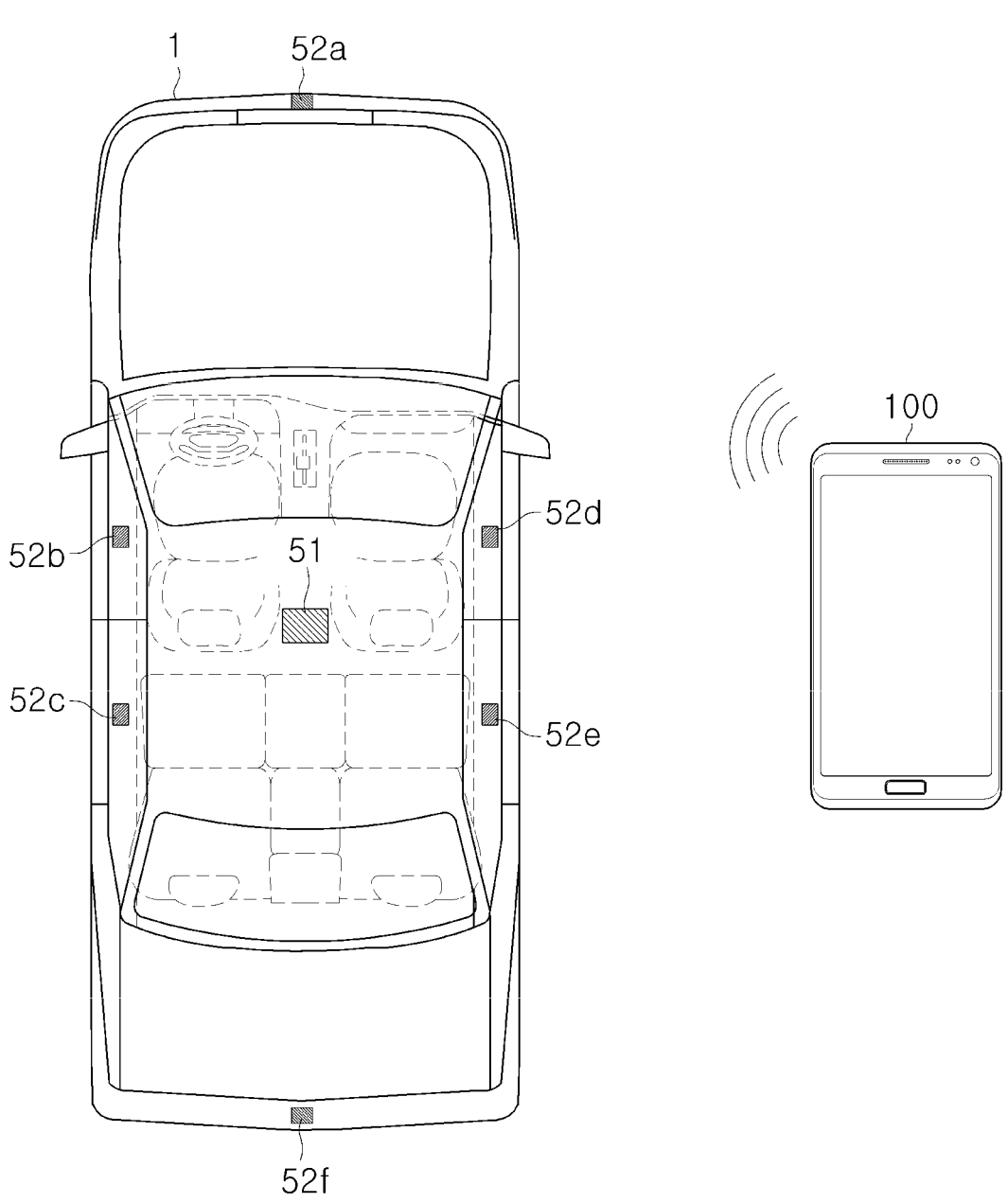
FIG. 3 illustrates ultra wide band (UWB) modules and a Bluetooth module mounted on a vehicle according to an embodiment.

Reference numerals used for method steps are just used for convenience of explanation, but not to limit an order of the steps. Thus, unless the context clearly dictates otherwise, the written order may be practiced otherwise. FIG. 1 is a control block diagram illustrating a vehicle according to an embodiment. FIG. 2 illustrates autonomous vehicle sensors such as cameras, radars, laser imaging, detection, and ranging (lidar), and the like, mounted on a vehicle according to an embodiment. FIG. 3 illustrates ultra-wide band (UWB) modules and a Bluetooth module mounted on a vehicle according to an embodiment.

Referring to FIG. 1 to FIG. 3, a vehicle 1 may include a controller 10 performing overall control.

The controller 10 may be electrically connected to autonomous vehicle sensors 20, 30 and 40, including a camera 20, a radar 30, and a lidar 40. However, the vehicle 1 is not limited to that shown in FIG. 1. For example, in the vehicle 1 illustrated in FIG. 1, at least one of the camera 20, the radar 30, or the lidar 40 may be omitted, or various other sensing means may be added to detect objects around the vehicle 1.

The controller 10, the camera 20, the radar 30 and the lidar 40 may be provided separately from each other. For example, the controller 10 may be installed in a housing separated from a housing of the camera 20, a housing of the radar 30, and a housing of the lidar 40. The controller 10 may exchange data with the camera 20, the radar 30, and/or the lidar 40 via a UWB network.

At least a portion of the controller 10, the camera 20, the radar 30 or the lidar 40 may be integrally provided. For example, the camera 20 and the controller 10 may be provided in a single housing, or the radar 30 and the controller 10 may be provided in a single housing, or the lidar 40 and the controller 10 may be provided in a single housing.

The camera 20 may photograph surroundings of the vehicle 1 and obtain image data which is camera data. For example, the camera 20 may be a front camera having a field of view 20A facing a front of the vehicle 1. In addition, the camera 20 may include a rear camera to secure a rear field of view of the vehicle 1 and/or a surround view camera to secure fields of view around the vehicle 1. The camera 20 may include a plurality of lenses and image sensors. The image sensor may include a plurality of photodiodes converting light into an electrical signal, and the plurality of photodiodes may be arranged in a two-dimensional (2D) matrix.

Image data may include information about objects located around the vehicle 1, such as moving vehicles, parked vehicles, pedestrians, bicycles, motorcycles, personal mobility (e.g. E-scooters, E-wheels, etc.), lanes, obstacles, curbs, guardrails, street trees, street lights, sidewalks, and bike paths, and the like. The objects may include a moving object and a stationary object.

The vehicle 1 may include an image processor processing the image data. For example, the image processor may be provided integrally with the camera 20 or the controller 10.

The image processor may obtain image data from an image sensor of the camera 20, detect and identify an object around the vehicle 1 based on the processing of the image data. For example, the image processor may generate a track representing the object around the vehicle 1 using image processing, and may classify the track. The image processor may identify whether the track is a moving vehicle, a parked vehicle, a pedestrian, a bicycle, a motorcycle, a personal mobility, a lane, an obstacle, a curb, a guardrail, a street tree, a street light, a sidewalk, a bike path, and the like, and assign an identification code to the track.

The image processor may transmit data (or a location and classification of track) about the track around the vehicle 1 (hereinafter referred to as "camera track") to the controller 10.

The radar 30 may transmit radio waves toward the surroundings of the vehicle 1 and detect the object around the vehicle 1 based on reflected radio waves reflected from the object around the vehicle 1.

The radar 30 may include a transmission antenna (or transmission antenna array) that radiates radio waves toward the surroundings of the vehicle 1, and a receiving antenna (or receiving antenna array) that receives reflected radio waves reflected from the object.

The radar 30 may obtain radar data from the radio waves transmitted by the transmission antenna and the reflected radio waves received by the receiving antenna. The radar data may include location information (e.g., distance information) and/or speed information of objects located in front of the vehicle 1.

For example, as shown in FIG. 2, the radar 30 may include a front radar 31, and a plurality of corner radars 32, 33, 34 and 35.

The front radar 31 may transmit detection data of a front center of the vehicle 1 (hereinafter referred to as 'front detection data') to the controller 10. For example, the front radar 31 may be installed in a center of a front bumper of the vehicle 1.

The plurality of corner radars 32, 33, 34 and 35 may include the first corner radar 32 installed on a front right side of the vehicle 1, the second corner radar 33 installed on a front left side of the vehicle 1, the third corner radar 34 installed on a rear right side of the vehicle 1, and the fourth corner radar 35 installed on a rear left side of the vehicle 1.

The first corner radar 32 may have a field of view 32A facing the front right side of the vehicle 1. For example, the first corner radar 32 may be installed on a right side of a front bumper of the vehicle 1. The second corner radar 33 may have a field of view 33A facing the front left side of the vehicle 1, and may be installed, for example, on a left side of the front bumper of the vehicle 1. The third corner radar 34 may have a field of view 34A facing the rear right side of the vehicle 1, and may be installed, for example, on a right side of a rear bumper of the vehicle 1. The fourth corner radar 35 may have a field of view 35A facing the rear left side of the vehicle 1, and may be installed, for example, on a left side of the rear bumper of the vehicle 1.

The plurality of corner radars 32, 33, 34 and 35 may obtain first corner detection data, second corner detection data, third corner detection data, and fourth corner detection data, respectively. The first corner detection data may include distance information and speed information about an object located in the front right side of the vehicle 1. The second corner detection data may include distance information and speed information about an object located in the front left side of the vehicle 1. The third and fourth corner detection data may include distance information and relative speed about objects located in the rear right side and rear left side of the vehicle 1, respectively.

The plurality of corner radars 32, 33, 34 and 35 may transmit, to the controller 10, the first corner detection data, the second corner detection data, the third corner detection data, and the fourth corner detection data, respectively.

The vehicle 1 may include a signal processor processing radar data of the radar 30. For example, the signal processor may be provided integrally with the radar 30 or integrally with the controller 10.

The signal processor may obtain the radar data from the receiving antenna of the radar 30, and generate a track representing an object by clustering a reflection point of a reflected signal. For example, the signal processor may obtain a distance of the track based on, for example, a time difference between a transmission point in time of radio wave and a reception point in time of reflected radio wave, and obtain a relative speed of the track based on a difference between a frequency of the transmitted radio wave and a frequency of the reflected radio wave.

The signal processor may transmit, to the controller 10, data (or a distance and relative speed of a track) about a track around the vehicle 1 obtained from the radar data (hereinafter referred to as 'radar track').

The lidar 40 may be installed on the vehicle 1 to have an external field of view of the vehicle 1.

The lidar 40 may emit light (e.g., infrared light) toward the surroundings of the vehicle 1 and detect objects around the vehicle 1 based on reflected light from the objects around the vehicle 1. For example, the lidar 40 may be mounted on a roof of the vehicle 1 as shown in FIG. 2, and may have a field of view 40A facing in all directions around the vehicle 1. The lidar 40 may also be mounted on the front bumper, a radiator grille, a hood, doors, side mirrors, a tailgate, a trunk lid, a fender, and the like.

The lidar 40 may include a light source (e.g., a light emitting diode (LED), a LED array, a laser diode, or a laser diode array) that emits light (e.g., infrared light, etc.) and a light sensor (e.g., a photodiode or photodiode array) that receives light (e.g., infrared light, etc.). In addition, as required, the lidar 40 may include a drive device for rotating the light source and/or the light sensor.

While the light source and/or light sensor are rotated, the lidar 40 may emit light through the light source and receive light reflected from an object through the light sensor, thereby obtaining lidar data.

The lidar data may include relative positions of nearby objects (distance to the nearby object and/or direction of the nearby object) and/or relative speeds of the nearby objects.

The vehicle 1 may include the signal processor processing the lidar data of the lidar 40. For example, the signal processor may be provided integrally with the lidar 40 or integrally with the controller 10.

The signal processor may generate a track representing an object by clustering a reflection point of a reflected signal. For example, the signal processor may obtain a distance to an object based on, for example, a time difference between a light emission point in time of and a light reception point in time. Also, the signal processor may obtain a direction (or angle) of an object relative to a driving direction of the vehicle 1 based on a direction in which the light source emits light when the light sensor receives a reflected light.

The signal processor may transmit, to the controller 10, data (or a distance and relative speed of a track) about a track around the vehicle 1 obtained from the lidar data (hereinafter referred to as 'lidar track').

In addition, the controller 10 may be electrically connected to a communicator 50.

The communicator 50 may perform communication with a user terminal 100 which is a digital key possessed by a user. In this instance, the user terminal 100 may be implemented as a computer or portable terminal that may access the vehicle 1 via a network. Here, the computer may include, for example, a laptop, a desktop, a tablet personal computer (PC), a slate PC, and the like, equipped with a web browser. The portable terminal may include, for example, all kinds of wireless communication device that guarantee portability and mobility such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a wideband CDMA (WCDMA), a wireless broadband Internet (WiBro) terminal, and a smartphone, and wearable devices such as a watch, ring, bracelet, anklet, necklace, eyeglasses, contact lenses, or head-mounted-device (HMD), and the like.

The communicator 50 may connect the vehicle 1 and the user terminal 100 through a short-range communication network. Here, the short-range communication network may include wireless local access network (WLAN), Wi-Fi, Bluetooth, Zigbee, Wi-Fi direct (WFD), Bluetooth low energy (BLE), radio frequency identification (RFID), near-field communication (NFC), and the like, without being limited thereto. For example, as shown in FIG. 3, the communicator 50 may include a Bluetooth module 51 which is a main communication module performing communication with the user terminal 100 via the short-range communication network, and UWB modules 52 (52A, 52B, 52C, 52D, 52E, and 52F) which are communication modules for positioning and receive a positioning signal of the user terminal 100. The Bluetooth module 51 may perform Bluetooth pairing with the user terminal 100 via a Bluetooth communication network. The Bluetooth module 51 may receive a search signal transmitted by the user terminal 100. The Bluetooth module 51 may be located between a headliner and a vehicle body of the vehicle 1 to perform Bluetooth communication with the digital key 100 inside and outside the vehicle. However, the number and location of the Bluetooth modules 51 are not limited thereto, and fewer or more Bluetooth modules 51 may be installed in different locations in the vehicle 1 depending on the specifications or performance of the vehicle 1. The UWB modules 52 may be located between the headliner and the vehicle body or located in a trunk to detect an inside and outside of the vehicle. However, the number and location of the UWB modules 52 are not limited thereto, and fewer or more UWB modules 52 may be installed in different locations of the vehicle 1 depending on the specifications or performance of the vehicle 1. Each of the plurality of UWB modules 52 may be provided at a preset location of the vehicle 1. The UWB modules 52 may obtain positioning information for estimating a position of the user terminal 100, and may transmit the positioning information to the controller 10. In this instance, the positioning information may include information about at least one of a strength or a direction of the search signal of the user terminal 100. The controller 10 may be electrically connected to the camera 20, the radar 30, the lidar 40, the communicator 50, a door locking device 60, a vehicle starting device 70, and the like, or connected via a vehicle communication network. The vehicle communication network may be Ethernet, media oriented systems transport (MOST), a FlexRay, controller area network (CAN), local interconnect network (LIN), and the like. The controller 10 may process the camera track (or image data) from the camera 20, the radar track (or radar data) from the radar 30, and/or the lidar track (or lidar data) from the lidar 40, and provide a control signal to the door locking device 60 and the vehicle starting device 70. The controller 10 may include a processor 11 and a memory 12.

The memory 12 may store a program and/or data for processing image data, radar data, and/or lidar data. Also, the memory 12 may store a program and/or data for generating a door lock signal and/or a vehicle start signal.

The memory 12 may temporarily store the image data received from the camera 20, the radar data received from the radar 30, and the lidar data received from the lidar 40, and temporarily store a processing result of the image data, the radar data and/or the lidar data of the processor 141.

Figure 4:
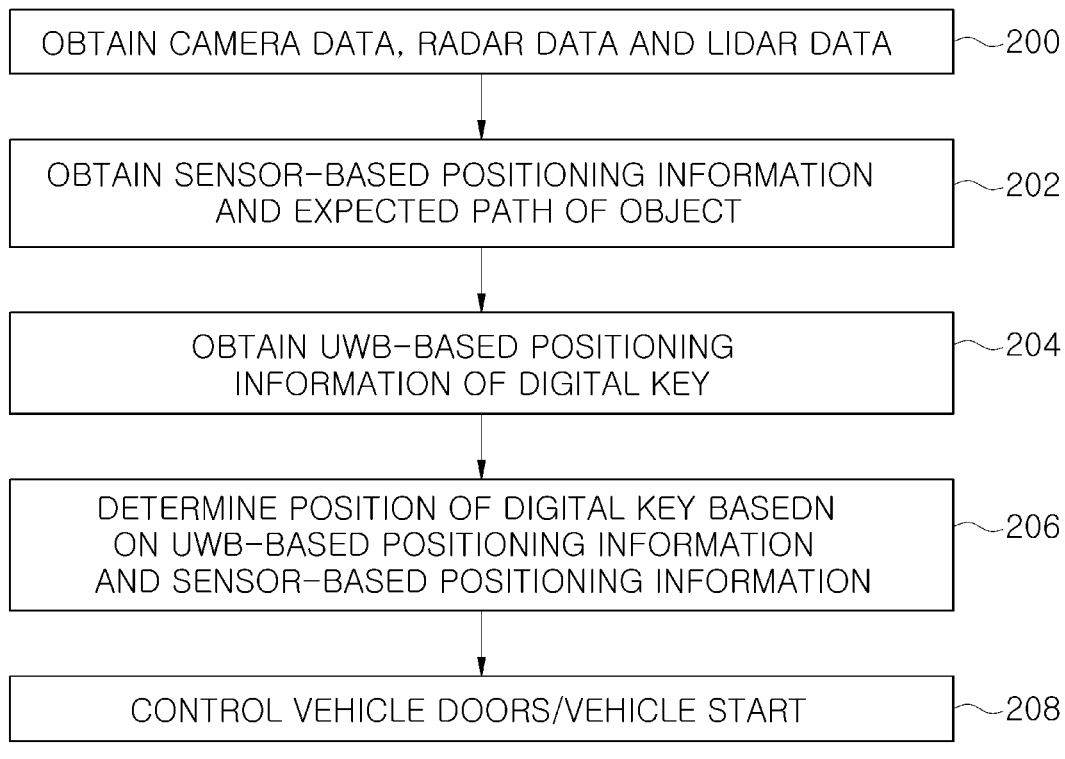
FIG. 4 is a flowchart illustrating a control method of a vehicle according to an embodiment.

The memory 12 may include a volatile memory such as a static random access memory (S-RAM), a dynamic RAM (D-RAM), as well as a non-volatile memory such as a flash memory, a read only memory (ROM), an erasable programmable read only memory (EPROM), and the like. The processor 11 may process the camera track of the camera 20, the radar track of the radar 30, and/or the lidar track of the lidar 40. For example, the processor 11 may fuse the camera track, the radar track and/or the lidar track, and output a fusion track. The processor 11 may include an image processor to process the image data of the camera 20, the signal processor to process the radar data of the radar 30 and/or the lidar data of the lidar 40, or a micro controller unit (MCU) to generate a door lock signal and/or a vehicle start signal. The door locking device 60 may lock or unlock a vehicle door based on a control signal of the controller 10. The vehicle starting device 70 may turn on or off the vehicle 1. The vehicle starting device 70 may supply power to a driving motor and/or an engine as a driving source of the vehicle 1 or cut off power supplied to the driving motor and/or engine based on a control signal of the controller 10. FIG. 4 is a flowchart illustrating a control method of a vehicle according to an embodiment. Referring to FIG. 4, the controller 10 may obtain camera data from the camera 20, radar data from the radar 30 and lidar data from the lidar 40, respectively (200). Here, the camera 20, the radar 30 and the lidar 40 are autonomous vehicle sensors. The controller 10 may obtain sensor-based positioning information and expected paths of objects located around the vehicle 1 based on the camera data, the radar data and the lidar data (202). The controller 10 may obtain UWB-based positioning information of the digital key 100 (204).

The controller 10 may determine a position of the digital key 100 based on the UWB-based positioning information of the digital key 100 and sensor-based positioning information of a user with the digital key 100 among the objects (206).

The controller 10 may control the door locking device 60 to lock or unlock vehicle doors, or control the vehicle starting device 70 to turn on or off the vehicle 1, depending on the position of the digital key 100 (208).

Figure 5:
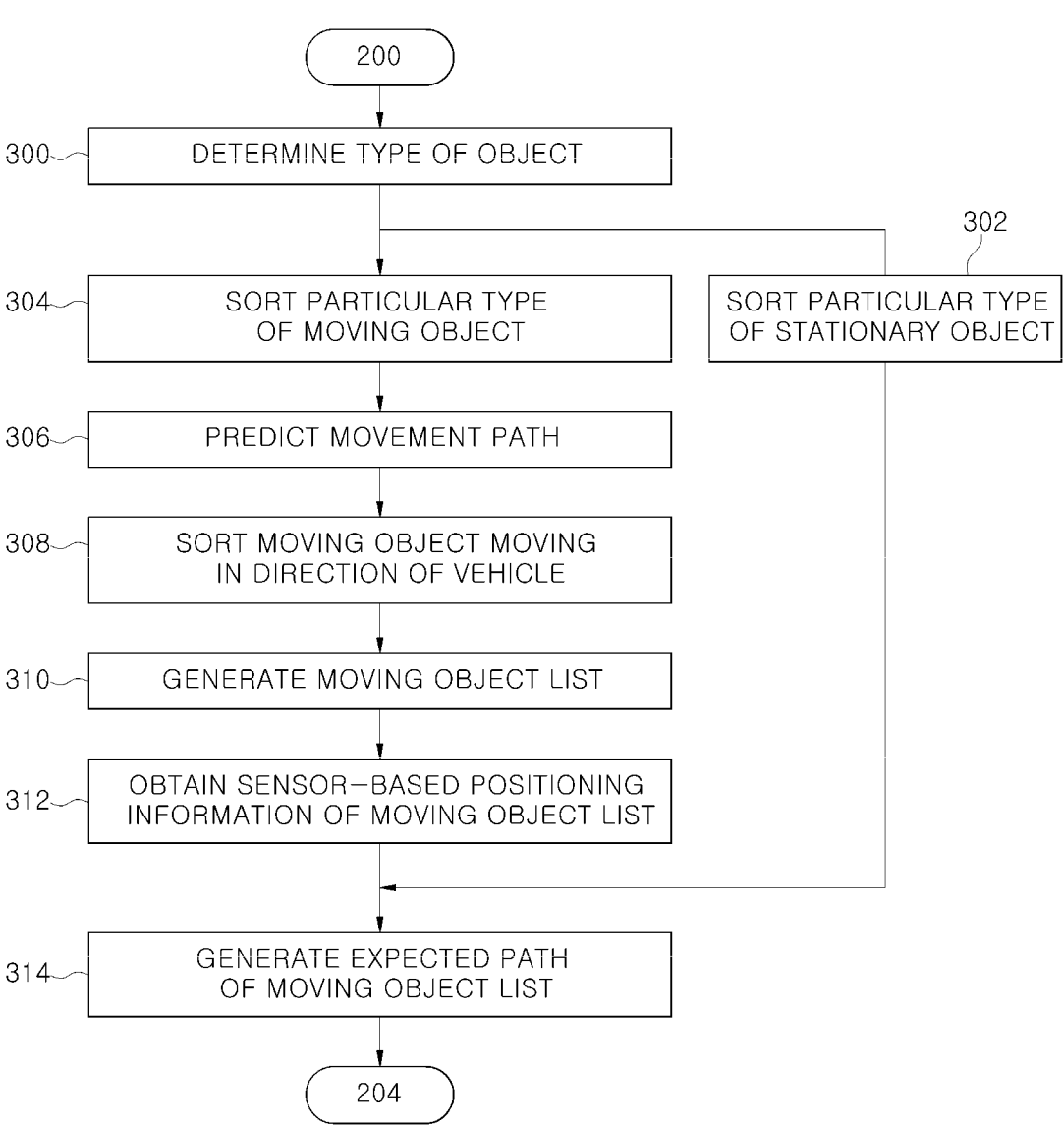
FIG. 5 is a flowchart illustrating operations of obtaining sensor-based positioning information of an object located around a vehicle using autonomous vehicle sensor-based positioning in the vehicle according to an embodiment.

FIG. 5 is a flowchart illustrating operations of obtaining sensor-based positioning information of an object located around a vehicle using autonomous vehicle sensor-based positioning in the vehicle according to an embodiment.

Referring to FIG. 5, the controller 10 may determine a type of an object located around the vehicle 1 (300).

The controller 10 may recognize a type of the object located around the vehicle 1 based on camera data, radar data, and lidar data obtained from the camera 20, the radar 30, and the lidar 40, respectively, which are autonomous vehicle sensors. For example, a moving vehicle, a parked vehicle, a pedestrian, a bicycle, a motorcycle, a personal mobility, a lane, an obstacle, a curb, a guardrail, a street tree, a street light, a sidewalk, a bike path, and the like, may be recognized.

The camera 20, the radar 30, and the lidar 40 may transmit, to the controller 10, distance information, azimuth information, and the like, for each target in real time when detecting objects within each detection area.

A processing logic of each of the camera 20, radar 30, and lidar 40 applied to the vehicle 1 may be used for filtering, target tracking, and decision processing logic of the camera 20, the radar 30, and the lidar 40 without change.

The camera 20 may transmit, to the controller 10, the camera data including distance information and angle information of a moving target, information of pedestrians and mobility devices (bicycles, motorcycles, personal mobility, etc.), and the like. The radar 30 may transmit the radar data including distance information and angle information of a moving target to the controller 10. The lidar 40 may transmit, to the controller 10, the lidar data including point cloud lidar information indicating a distance between a stationary object and a moving object and three-dimensional (3D) object information.

The controller 10 may classify objects into a stationary object and a moving object.

The controller 10 may distinguish whether an object is stationary or moving by fusing the camera data, the radar data, and the lidar data.

The controller 10 may increase an accuracy of measuring a position, speed, shape, and the like, of the object by fusing the camera data, the radar data, and the lidar data. Accordingly, whether an object located around the vehicle 1 is a stationary object or a moving object may be accurately distinguished.

When the object is a stationary object, the controller 10 may sort (select) a particular type of stationary object from among the stationary objects (302). The controller 10 may sort a stationary object that may affect a movement path of a user with the digital key approaching the vehicle 1 from among the stationary objects. For example, the controller 10 may sort a parked vehicle, a lane, an obstacle, a curb, a guardrail, a street tree, a street light, a sidewalk, a bike path, and the like, from among the stationary objects.

When the object is a moving object, the controller 10 may sort a particular type of moving object from among the moving objects (304). A moving object that may be a candidate for a user with the digital key may be sorted from among the moving objects. For example, the controller 10 may sort a pedestrian, a two-wheeled vehicle (bicycle, motorcycle, personal mobility, etc.), from among the moving objects.

The controller 10 may predict a movement path of the sorted moving object (306).

The controller 10 may estimate the movement path of the sorted moving object from tracking of the sorted moving object.

The controller 10 may sort a moving object moving in a direction of the vehicle from among the moving objects based on the movement path of the sorted moving object (308).

The controller 10 may generate a moving object list for moving objects moving in a direction of the vehicle (310).

The controller 10 may obtain sensor-based positioning information of a moving object included in the moving object list (312).

The controller 10 may obtain precise positioning information for estimating a position of moving object by map-matching the moving object included in the moving object list with a grid map. The precise positioning information of the moving object is sensor-based positioning information, and may be positioning information such as a distance to the moving object, an azimuth angle, and the like, used to estimate the position of the moving object on the grid map.

The controller 10 may generate an expected path of the moving object list (314).

The controller 10 may generate, as the expected path, a path where the moving object list is expected to travel relative to the sorted stationary object. For example, when the moving object is a pedestrian and the stationary object is a sidewalk, the pedestrian is highly likely to travel along the sidewalk. Accordingly, a path for the pedestrian to travel along the sidewalk may be generated as the expected path. Also, when the moving object is a bicycle or personal mobility and the stationary object is a bike path, the bicycle or personal mobility is highly likely to travel along the bike path. A path for the bicycle or personal mobility to travel along the bike path may be generated as the expected path. Meanwhile, when obstacles, curbs, parked vehicles, and the like, exist on a path where the pedestrian, the bicycle, or the personal mobility travels, an expected path may be generated to avoid the obstacles, curbs, parked vehicles, and the like.

When map-matching the moving object list with the grid map, positioning precision may be improved by map-matching based on location information of stationary object extracted from the camera 20 and the lidar 40.

As described above, the sensor-based positioning information of the moving object list may be continuously updated by repeatedly performing processes of obtaining the sensor-based positioning information of moving object.

Figure 6:
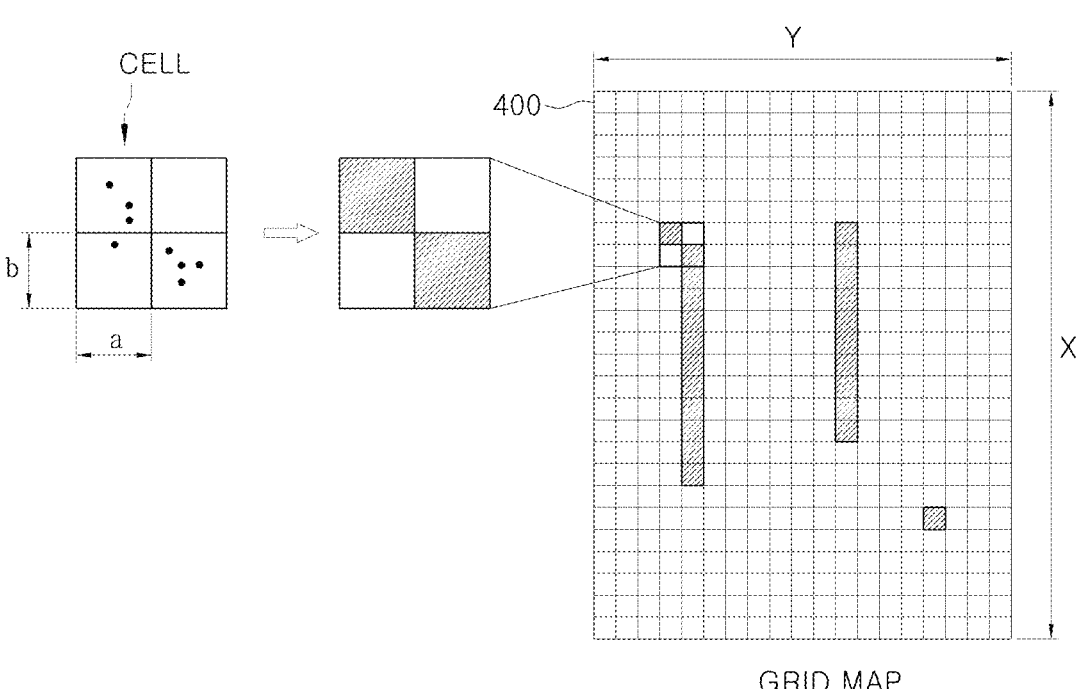
FIG. 6 is a diagram illustrating an example of an autono- mous vehicle sensor-based grid map in a vehicle according to an embodiment.

FIG. 6 is a diagram illustrating an example of an autonomous vehicle sensor-based grid map in a vehicle according to an embodiment.

Referring to FIG. 6, a grid map 400 may be generated by fusing camera data, radar data and lidar data. The grid map 400 is a probability-based map that represents information about a state (e.g., travelable area, obstacles, etc.) of each location at cells having specific intervals.

The grid map 400 may decompose a surrounding environment of the vehicle 1 into N cells, and each cell may have a probability value for determining occupancy of an object. A size of a cell may have a width of a [m] and a length of b [m], and may have an initial probability value.

Coordinate axes of the grid map may be set based on reference points (bumper center, vehicle center of gravity, etc.) of the vehicle 1. An interval between grids is changeable according to a resolution of the autonomous vehicle sensor. A short distance that requires precise positioning may be subdivided and expressed to an extent that the resolution of the autonomous vehicle sensor is allowed.

For example, the grid map 400 is generated in units of cells of a predetermined size with respect to lidar points, lidar points present within a specific area are assigned to a cell size, and it may be determined that a cell has a valid probability value when the number of lidar points within the corresponding cell is equal to or greater than a predetermined number. By distinguishing object cells from background cells within the grid map 400 and clustering the object cells to track and classify objects through the above-described map-matching manner, coordinates of a moving object on the grid map 400 may be located, thereby obtaining precise positioning information of the moving object.

FIG. 7 is a flowchart illustrating operations of obtaining UWB-based positioning information of a digital key using UWB-based positioning in a vehicle according to an embodiment.

Referring to FIG. 7, the controller 10 may determine whether a moving object included in a moving object list approaches a vehicle (500).

The controller 10 may determine whether a moving object exists within a predetermined range of the vehicle from the moving object list, based on distance information and angle information of the moving object included in the moving object list. For example, when a distance to the moving object included in the moving object list is shorter than a preset distance, it may be determined that the moving object is close to the vehicle.

The controller 10 may perform Bluetooth pairing with the moving object close to the vehicle through the Bluetooth module 51 (502).

The controller 10 may attempt the Bluetooth (BLE) pairing in order to confirm whether the moving object close to the vehicle is a user with a digital key.

When the Bluetooth pairing is not successful (No in operation 504), the controller 10 may stand by until the moving object list is updated.

When succeeding in the BLE pairing with the moving object close to the vehicle (Yes in operation 504), the controller 10 may determine the moving object close to the vehicle as the user with the digital key (506).

The controller 10 may determine the user with the digital key, based on BLE positioning information derived based on a received signal strength indicator (RSSI) value received from the digital key 100 and sensor-based positioning information of the moving object close to the vehicle. RSSI is a measurement value of power present in a received radio signal, and the closer the distance between a transmitter transmitting a packet and a receiver receiving the packet, the higher the RSSI value, and the further away the distance, the lower the RSSI value.

The controller 10 may perform UWB-based positioning of the digital key 100 of the user having the digital key (508).

The controller 10 may obtain UWB-based positioning information of the digital key 100 according to a UWB signal received from the digital key 100 (510).

The controller 10 locates the digital key 100 by performing UWB communication with the completely BLE-paired digital key 100 via the UWB modules 52 based on an expected path of the user with the digital key.

The UWB modules 52 may receive a UWB signal transmitted from the digital key 100.

The UWB signal transmitted from the digital key 100 may be transmitted from the digital key 100 at preset intervals, or may refer to a signal transmitted from the digital key 100 in response to a signal transmitted from the UWB modules 52.

The controller 10 may determine a position of the digital key 100 based on the UWB signal received through each of the plurality of UWB modules 52A to 52F.

Specifically, because each of the plurality of UWB modules 52A to 52F is disposed in a different location, arrival times of the UWB signals received by each of the UWB modules 52A to 52F may be different from each other, and the controller 10 may determine the position of the digital key 100 using the difference in arrival time.

Further, when each of the plurality of UWB modules 52A to 52F transmits a response signal in response to the UWB signal transmitted from the digital key 100, the digital key 100 may transmit a reply signal in response to the response signal, and the controller 10 may calculate a distance between each of the UWB modules 52A to 52F and the digital key 100 based on a difference between a point in time of transmitting the response signal and a point in time of receiving the reply signal. In this instance, when at least three UWB modules 52 exist, the controller 10 may employ a triangulation method to determine the exact position of the digital key 100.

As such, the controller 10 may determine the position of the digital key 100 based on various positioning algorithms. The controller 10 may determine the position of the digital key 100 based on a time difference of arrival (TDoA) of the UWB signal, or based on two way ranging (TWR) method based on time of flight (ToF). In addition, the controller 10 may identify the position of the digital key 100 using various positioning algorithms such as angle of arrival (AoA), angle of departure (Aod), time of arrival (ToA), time of flight (ToF), and the like, without being limited thereto.

The above-described methods such as ToF, AoA, ToA, and TDoA may be used to estimate the position of the digital key 100, and obtained distance values may be combined, and thus the position of the digital key 100 may be estimated based on trilateration and triangulation. In this instance, various filter circuits such as a Kalman filter and a noise filter may be used to implement the positioning algorithm.

Figure 8:
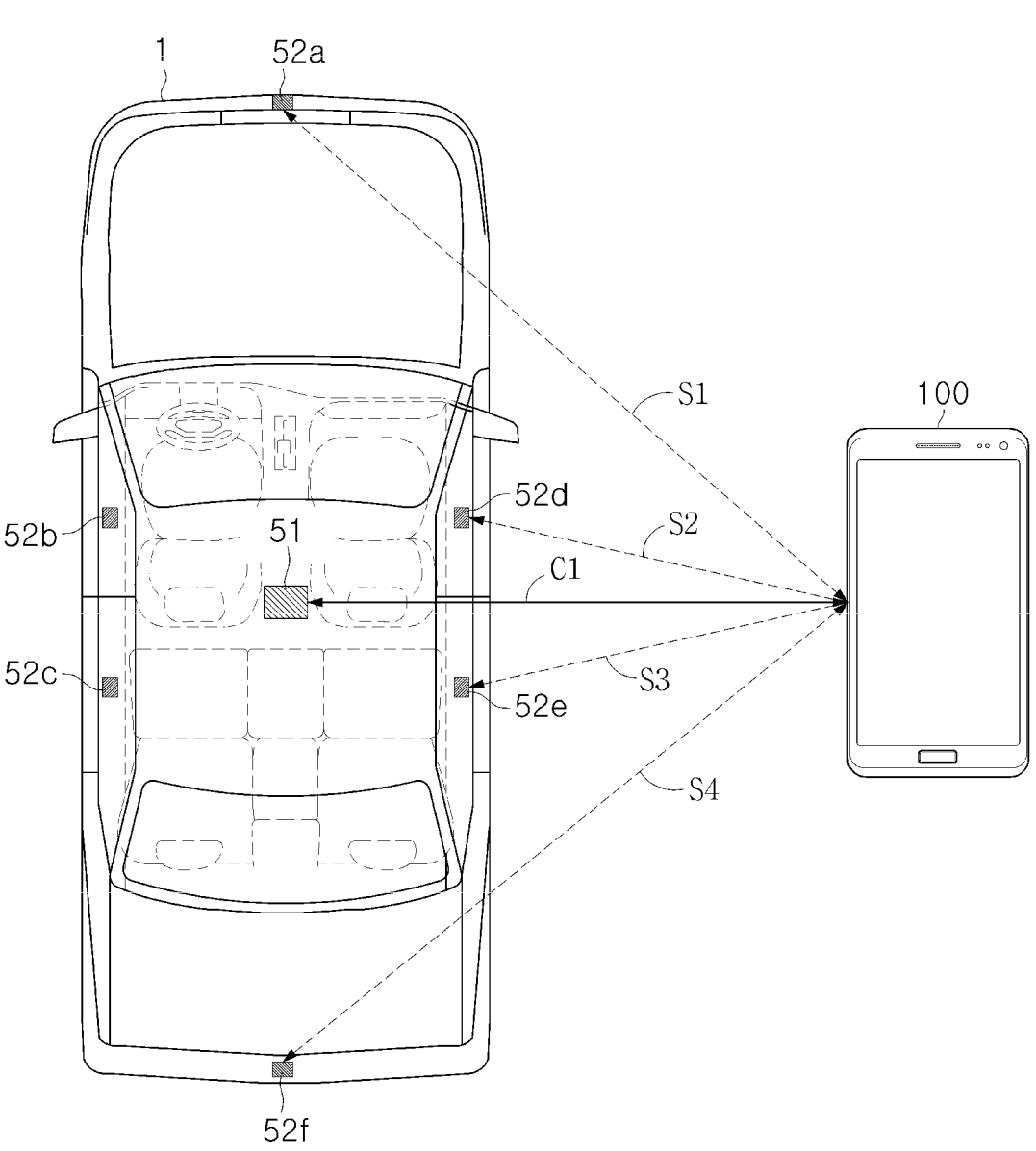
FIG. 8 and FIG. 9 illustrate performing Bluetooth pairing between a digital key and a Bluetooth module, and perform- ing UWB-based positioning for the digital key using UWB communication between the digital key and a UWB module in a vehicle according to an embodiment.
Figure 9:
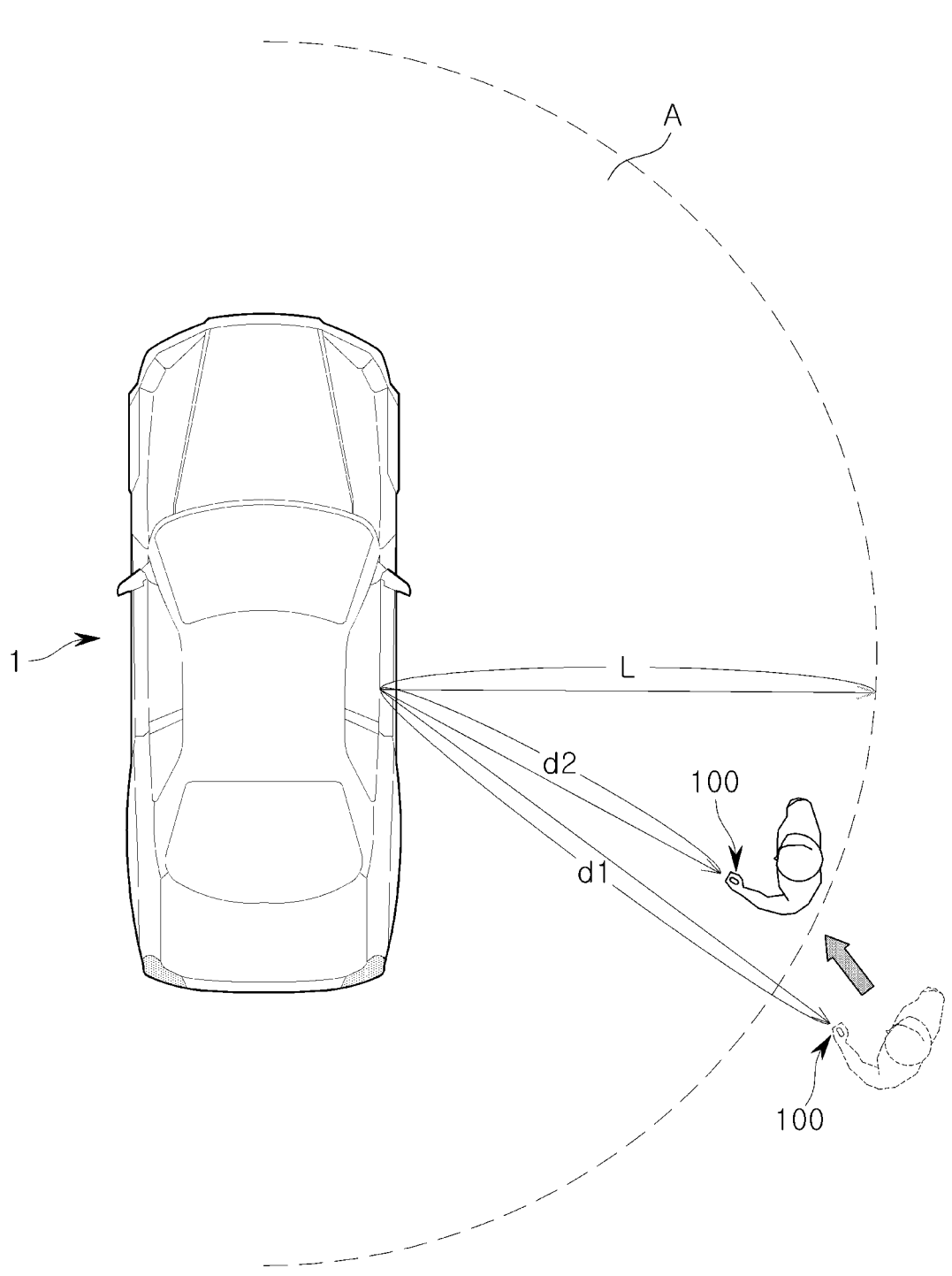

FIG. 8 and FIG. 9 illustrate performing Bluetooth pairing between a digital key and a Bluetooth module, and performing UWB-based positioning for the digital key using UWB communication between the digital key and a UWB module in a vehicle according to an embodiment.

Referring to FIG. 8 and FIG. 9, the controller 10 may determine that a moving object like a user with the digital key 100 is close to the vehicle, when a distance to the moving object is shorter than a preset distance L (d1→d2).

The controller 10 may receive a search signal C1 transmitted from the digital key 100 of the moving object close to the vehicle through the Bluetooth module 51, and when the search signal C1 is received, the controller 10 may perform BLE pairing with the digital key 100 by transmitting a response signal to the search signal C1 to the digital key 100.

The controller 10 may detect the search signal within a predetermined detection area through the Bluetooth module 51. In this instance, the detection area may refer to an area where a strength of the search signal received from the digital key 100 is equal to or greater than a predetermined reference signal strength. For example, the detection area may be an area where an RSSI of the search signal of the digital key 100 is equal to or greater than a predetermined RSSI value, without being limited thereto.

The controller 10 may determine the user with the digital key 100 based on BLE positioning information derived based on an RSSI value received from the digital key 100 and/or sensor-based positioning information of the moving object close to the vehicle.

The controller 10 may obtain positioning information for estimating the position of the digital key 100 of the user having the digital key 100 through the UWB modules 52. In this instance, the positioning information may include information about at least one of a strength or a direction of a UWB signal of the digital key 100.

Figure 10:
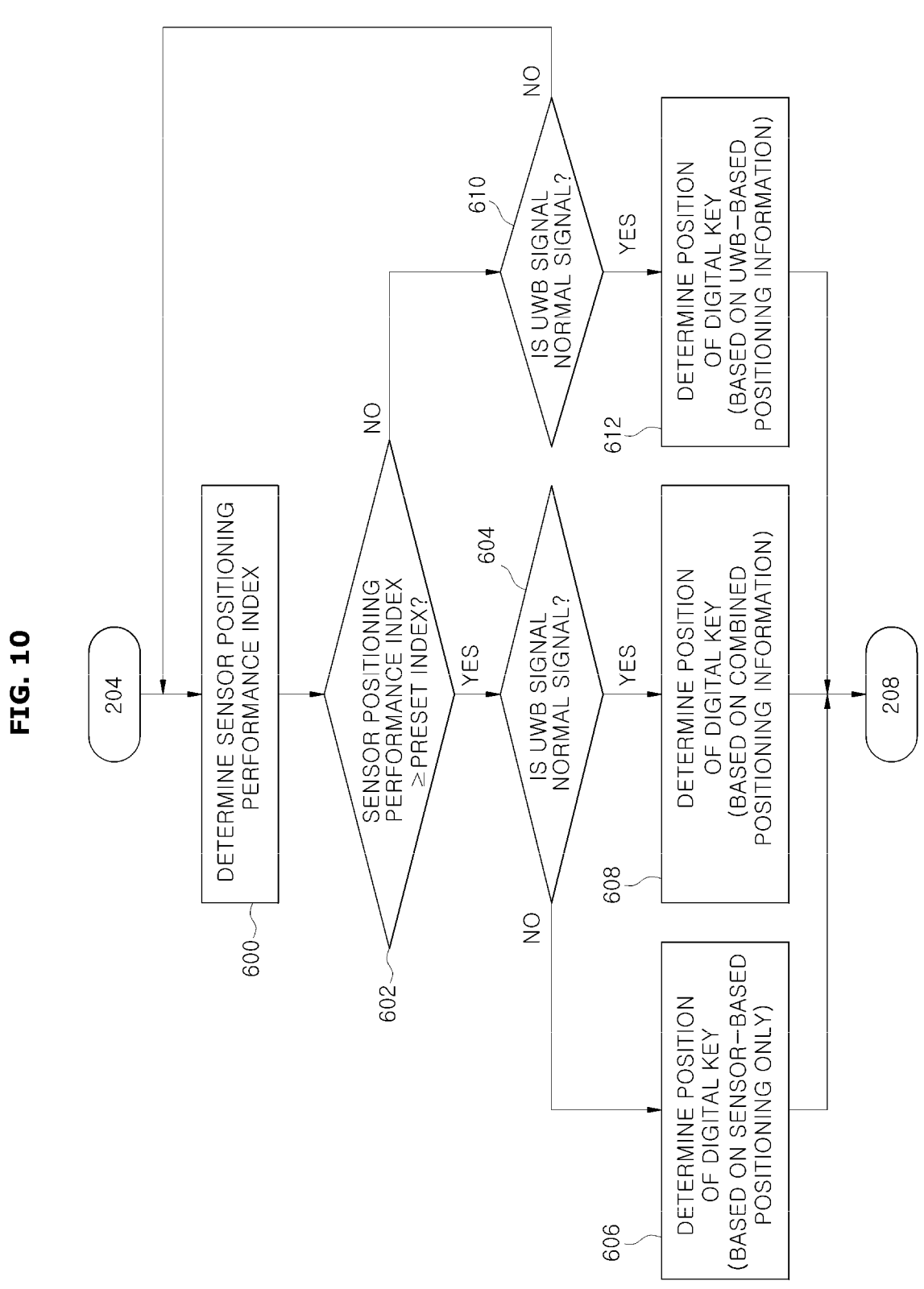
FIG. 10 is a flowchart illustrating operations of determin- ing a position of a digital key using sensor-based positioning information and UWB-based positioning information in a vehicle according to an embodiment.

The controller 10 may receive the UWB signal from the digital key 100 through the UWB modules 52, and obtain positioning information including information about at least one of a strength or a direction of each of the received UWB signals S1, S2, S3 and S4. FIG. 10 is a flowchart illustrating operations of determining a position of a digital key using sensor-based positioning information and UWB-based positioning information in a vehicle according to an embodiment.

Referring to FIG. 10, the controller 10 may determine a sensor positioning performance index of an autonomous vehicle sensor (600).

The sensor positioning performance index of the autonomous vehicle sensor may be a performance index indicating a positioning accuracy of a user with a digital key due to obstacles around the vehicle 1. By using the number of obstacles (parked vehicles, poles, walls, etc.) of stationary objects around the vehicle 1 detected through the autonomous vehicle sensors, such as the camera 20, the radar 30, and the lidar 40, and a location (indoor, outdoor, shaded area, etc.) of the vehicle 1 detected through a global positioning system (GPS) of the vehicle 1, the positioning accuracy of the user having the digital key may be calculated as the sensor positioning performance index. For example, the sensor positioning performance index may be calculated as a low level, a middle level, a high level, and the like. The low level may refer to a low sensor positioning performance index, and a high level may refer to a high sensor positioning performance index.

The controller 10 may determine whether the sensor positioning performance index is equal to or greater than a preset index (e.g., middle level) (602).

When the sensor positioning performance index is equal to or greater than the preset index (Yes in operation 602), the controller 10 may determine whether a UWB signal is a normal signal (604).

The controller 10 may determine that the UWB signal is an abnormal signal, when the UWB signal is disconnected, when the UWB signal is a signal in which the digital key 100 is in an abnormal position, or when the UWB signal is a signal in response to a UWB communication failure, and otherwise determine that the UWB signal is a normal signal.

When the UWB signal is an abnormal signal (No in operation 604), the controller 10 may determine a position of the digital key 100 based on sensor-based positioning information (606).

When the UWB signal is a normal signal (Yes in operation 604), the controller 10 may determine the position of the digital key 100 based on the sensor-based positioning information and UWB-based positioning information (608).

Meanwhile, when the sensor positioning performance index is less than the preset index (No in operation 602), the controller 10 may determine whether the UWB signal is a normal signal (610).

When the UWB signal is a normal signal (Yes in operation 604), the controller 10 may determine the position of the digital key 100 based on the UWB-based positioning information (612).

As described above, the position of the digital key 100 may be corrected by comparing a reliability of the sensor-based positioning information and the UWB-based positioning information to determine a final position of the digital key 100.

Afterwards, the controller 10 may control constituent components of the vehicle 1 based on the final position of the digital key 100 to provide various convenient functions such as opening and closing doors and/or turning on/off the vehicle.

Meanwhile, the controller 10 may distinguish a digital key controller from an autonomous driving controller connected via a vehicle communication network.

The autonomous driving controller may obtain camera data, radar data and lidar data from the autonomous vehicle sensors, and may obtain sensor-based positioning information and an expected path of an object located around the vehicle 1 based on the obtained data.

The digital key controller may obtain UWB-based positioning information of the digital key 100 among objects, and determine the position of the digital key 100 based on the sensor-based positioning information of the user with the digital key 100 and the UWB-based positioning information of the digital key 100. Also, the digital key controller may control the door locking device 60 to open or close vehicle doors, or control the vehicle starting device 70 to turn on or off the vehicle 1, depending on the position of the digital key 100.

In order for the digital key controller to receive the sensor-based positioning information and the expected path of the object located around the vehicle 1 from the autonomous driving controller, the autonomous driving controller requires to maintain a wake-up state. In this case, because a vehicle discharge may occur, a state of a vehicle network is required to be considered.

When the vehicle network is in a wake-up state, the digital key controller receives information related to the sensor-based positioning information from the autonomous driving controller, uses the received information related to the sensor-based positioning information to limit a target object, and performs relevant controls such as Bluetooth pairing with the target object, obtaining the UWB-based positioning information of the digital key 100, and the like.

However, when the vehicle network is in a sleep state, the digital key controller may first perform Bluetooth pairing and, upon successful Bluetooth pairing, request a wake-up of the autonomous driving controller to receive information related to the sensor-based positioning information from the autonomous driving controller, and use the received information related to the sensor-based positioning information.

As is apparent from the above, according to the embodiments of the disclosure, a positioning accuracy and positioning reliability for a digital key can be improved by combining a sensor-based positioning technology using autonomous vehicle sensors with a UWB-based positioning technology.

Also, by combining the sensor-based positioning technology using autonomous vehicle sensors such as in-vehicle cameras, radars, lidars, and the like with the UWB-based positioning technology, an influence of external noise can be minimized and a moving person can be detected and determined, thereby improving UWB-based positioning. Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like. The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SSD), a silicon disk drive (SDD), a read only memory (ROM), a compact disc read only memory (CD-ROM), a magnetic tape, a floppy disk, an optical recording medium, and the like.

What is claimed is:

1. A vehicle, comprising:
an autonomous vehicle sensor configured to detect an object located around the vehicle;
an ultra wide band (UWB) module configured to receive a UWB signal transmitted from a digital key; and
a controller configured to be electrically connected to the UWB module,
wherein the controller is configured to:
obtain sensor-based positioning information of the object located around the vehicle based on sensor data obtained by the autonomous vehicle sensor,
obtain UWB-based positioning information of the digital key based on the UWB signal received in the UWB module,
determine a position of the digital key based on the sensor-based positioning information of the object and the UWB-based positioning information of the digital key,
control the vehicle based on the determined position of the digital key, and
obtain the sensor-based positioning information and the UWB-based positioning information in a different order depending on whether a vehicle network is in a wake-up state or a sleep state.

2. The vehicle of claim 1, wherein the autonomous vehicle sensor comprises a combination of at least two of: (1) a camera, (2) a radar, or (3) a laser imaging, detection, and ranging (lidar) which are provided to have a field of view around the vehicle, and the controller is further configured to:
in response to the vehicle network being in the wake-up state, classify the object into stationary objects and moving objects based on fusion data obtained by the autonomous vehicle sensor, generate a moving object list for moving objects moving in a direction of the vehicle among the moving objects, and obtain sensor-based positioning information of the moving object list, and in response to the vehicle network being in the sleep state, perform Bluetooth pairing, request to wake up an autonomous driving controller connected to the vehicle network after the Bluetooth pairing is successful, and receive the sensor-based positioning information of the moving object list from the woken autonomous driving controller to obtain the sensor-based positioning information of the moving object list.

3. The vehicle of claim 2, wherein the controller is further configured to generate a grid map based on the fusion data, and match the moving object list with the grid map to obtain the sensor-based positioning information of the moving object list.

4. The vehicle of claim 2, wherein the controller is further configured to:

sort a pedestrian and a two-wheeled vehicle from among the moving objects, generate the moving object list for moving objects moving in the direction of the vehicle among the pedestrian and the two-wheeled vehicle, and generate an expected path of the moving object list according to a movement path of the moving object list and respective positions of the stationary objects.

5. The vehicle of claim 4, further comprising:

a Bluetooth module configured to perform Bluetooth communication with the digital key, wherein the controller is further configured to:

perform Bluetooth communication through the Bluetooth module in response to the moving object list approaching the vehicle within a preset range, and determine a moving object that successfully pairs with the Bluetooth module from the moving object list as a user with the digital key.

6. The vehicle of claim 5, wherein the controller is further configured to perform UWB communication with the digital key based on an expected path of the user with the digital key, and obtain the UWB-based positioning information of the digital key based on the UWB signal received from the digital key.

7. The vehicle of claim 5, wherein the controller is further configured to determine the position of the digital key based on sensor-based positioning information of the user with the digital key and the UWB-based positioning information of the digital key.

8. The vehicle of claim 7, wherein the controller is further configured to determine the position of the digital key based on the sensor-based positioning information of the user with the digital key and the UWB-based positioning information of the digital key, based on the UWB signal not being disconnected, and not corresponding to a UWB communication failure, and a sensor positioning performance index of the autonomous vehicle sensor being higher than a preset index.

9. The vehicle of claim 7, wherein the controller is further configured to determine the position of the digital key based on the UWB-based positioning information of the digital key, based on the UWB signal not being disconnected, and not corresponding to a UWB communication failure, and a sensor positioning performance index of the autonomous vehicle sensor being lower than a preset index.

10. The vehicle of claim 7, wherein the controller is further configured to determine the position of the digital key based on the sensor-based positioning information of the user with the digital key, based on the UWB signal being disconnected, corresponding to a UWB communication failure, and a sensor positioning performance index of the autonomous vehicle sensor being higher than a preset index.

11. A control method of a vehicle, the control method comprising:

obtaining sensor data through an autonomous vehicle sensor configured to detect an object located around the vehicle;

obtaining sensor-based positioning information of the object located around the vehicle based on the obtained sensor data;

obtaining, by an ultra wide band (UWB) module, UWB-based positioning information of a digital key based on a signal transmitted from the digital key;

determining a position of the digital key based on the sensor-based positioning information of the object and the UWB-based positioning information of the digital key; and controlling the vehicle based on the determined position of the digital key, wherein the sensor-based positioning information and the UWB-based positioning information are obtained in a different order depending on whether a vehicle network is in a wake-up state or a sleep state.

12. The control method of claim 11, wherein the autonomous vehicle sensor comprises a combination of at least two of: (1) a camera, (2) a radar, or (3) a lidar which are provided to have a field of view around the vehicle, and the obtaining of the sensor-based positioning information of the object comprises:

in response to the vehicle network being in the wake-up state, classifying the object into stationary objects and moving objects based on fusion data obtained by the autonomous vehicle sensor, generating a moving object list for moving objects moving in a direction of the vehicle among the moving objects, and obtaining sensor-based positioning information of the moving object list, and in response to the vehicle network being in the sleep state, performing Bluetooth pairing, requesting to wake up an autonomous driving controller connected to the vehicle network after the Bluetooth pairing is successful, and receiving the sensor-based positioning information of the moving object list from the woken autonomous driving controller to obtain the sensor-based positioning information of the moving object list.

13. The control method of claim 12, wherein the obtaining of the sensor-based positioning information of the object step further comprises:

generating a grid map based on the fusion data, and matching the moving object list with the grid map to obtain the sensor-based positioning information of the moving object list.

14. The control method of claim 12, wherein the obtaining of the sensor-based positioning information of the object step further comprises:

sorting a pedestrian and a two-wheeled vehicle from among the moving objects, generating the moving object list for moving objects moving in the direction of the vehicle among the pedestrian and the two-wheeled vehicle, and generating an expected path of the moving object list according to a movement path of the moving object list and respective positions of the stationary objects.

15. The control method of claim 14, wherein the obtaining of the UWB-based positioning information of the digital key step further comprises:

performing Bluetooth communication through a Bluetooth module configured to perform Bluetooth communication with the digital key, in response to the moving object list approaching the vehicle within a preset range, and determining a moving object that successfully pairs with the Bluetooth module from the moving object list as a user with the digital key.

16. The control method of claim 15, wherein the obtaining of the UWB-based positioning information of the digital key step further comprises:

performing UWB communication with the digital key based on an expected path of the user with the digital key, and obtaining the UWB-based positioning information of the digital key based on the UWB signal received from the digital key.

17. The control method of claim 15, wherein the determining of the position of the digital key step further comprises determining the position of the digital key based on sensor-based positioning information of the user with the digital key and the UWB-based positioning information of the digital key.

18. The control method of claim 17, wherein the determining of the position of the digital key step further comprises determining the position of the digital key based on the sensor-based positioning information of the user with the digital key and the UWB-based positioning information of the digital key, based on the UWB signal not being disconnected, and not corresponding to a UWB communication failure, and a sensor positioning performance index of the autonomous vehicle sensor being higher than a preset index.

19. The control method of claim 17, wherein the determining of the position of the digital key step further comprises determining the position of the digital key based on the UWB-based positioning information of the digital key, based on the UWB signal not being disconnected, and not corresponding to a UWB communication failure, and a sensor positioning performance index of the autonomous vehicle sensor being lower than a preset index.

20. The control method of claim 17, wherein the determining of the position of the digital key step further comprises determining the position of the digital key based on the sensor-based positioning information of the user with the digital key, based on the UWB signal being disconnected, corresponding to a UWB communication failure, and a sensor positioning performance index of the autonomous vehicle sensor being higher than a preset index.

* * * * *